US007249652B2

(12) United States Patent
Wolf

(10) Patent No.: US 7,249,652 B2
(45) Date of Patent: Jul. 31, 2007

(54) FLUID GUIDELINE, ESPECIALLY IN THE FORM OF A TUBE FOR TAKING UP UNTREATED AIR IN AN AIR FILTER OF A MOTOR VEHICLE

(75) Inventor: Anton Wolf, Gelnhausen (DE)

(73) Assignee: WOCO Industrietechnik GmbH (DE)

( * ) Notice: Subject to any disclaimer, the term of this patent is extended or adjusted under 35 U.S.C. 154(b) by 328 days.

(21) Appl. No.: 10/489,013

(22) PCT Filed: Sep. 11, 2002

(86) PCT No.: PCT/EP02/10204

§ 371 (c)(1),
(2), (4) Date: Mar. 8, 2004

(87) PCT Pub. No.: WO03/023217

PCT Pub. Date: Mar. 20, 2003

(65) Prior Publication Data

US 2004/0262076 A1 Dec. 30, 2004

(30) Foreign Application Priority Data

Sep. 12, 2001 (DE) ................................ 101 44 972

(51) Int. Cl.
*F01N 1/06* (2006.01)
*F02M 35/12* (2006.01)
*F16L 11/15* (2006.01)
*F16L 55/27* (2006.01)
*F16L 27/11* (2006.01)

(52) U.S. Cl. ...................... 181/248; 181/247; 181/229; 123/184; 123/57; 285/49; 285/299

(58) Field of Classification Search ................ 181/247, 181/248, 256, 229; 123/184.57; 285/49, 285/299
See application file for complete search history.

(56) References Cited

U.S. PATENT DOCUMENTS 3,061,039 A * 10/1962 Peters ........................ 181/233
3,966,014 A * 6/1976 Gowing ...................... 181/229
4,136,756 A * 1/1979 Kawamura .................. 181/229
4,371,053 A * 2/1983 Jones ......................... 181/249

(Continued)

FOREIGN PATENT DOCUMENTS

DE 38 30 346 1/1992

(Continued)

OTHER PUBLICATIONS

*Patent Abstracts of Japan* for Japanese 60050265A, Mar. 19, 1985.

*Primary Examiner*—Lincoln Donovan
*Assistant Examiner*—Jeremy Luks
(74) *Attorney, Agent, or Firm*—Schiff Hardin LLP

(57) ABSTRACT

A fluid guideline with at least two structural elements made of substantially soundproof material has at least one opening for sound damping. An impedance change (in particular in the form of an impedance discontinuity) of the flow resistance of the fluid flowing through the fluid guideline is present between two adjacent structural elements, and the at least one opening is arranged in the region of the impedance change between two adjacent structural elements.

18 Claims, 2 Drawing Sheets

U.S. PATENT DOCUMENTS

| | | | | |
|---|---|---|---|---|
| 4,782,912 | A * | 11/1988 | Wandless | 181/229 |
| 4,800,985 | A * | 1/1989 | Hanzawa et al. | 181/229 |
| 5,116,231 | A * | 5/1992 | Oki et al. | 123/184.57 |
| 5,307,767 | A * | 5/1994 | Schutz | 123/184.57 |
| 5,529,743 | A * | 6/1996 | Powell | 264/513 |
| 5,806,480 | A * | 9/1998 | Maeda et al. | 123/184.57 |
| 5,881,554 | A * | 3/1999 | Novak et al. | 60/302 |
| 5,900,595 | A * | 5/1999 | Akima et al. | 181/229 |
| 5,929,397 | A * | 7/1999 | Satoh et al. | 181/229 |
| 6,006,712 | A * | 12/1999 | Suzuki | 123/184.57 |
| 6,520,284 | B2 | 2/2003 | Spannbauer et al. | |
| 2001/0004887 | A1 | 6/2001 | Hwang et al. | |

FOREIGN PATENT DOCUMENTS

| | | | |
|---|---|---|---|
| DE | 196 29 368 | | 1/1998 |
| DE | 197 50 102 | | 6/1999 |
| EP | 0 360 044 | | 8/1989 |
| EP | 0 837 238 | | 4/1998 |
| EP | 1 022 505 | | 7/2000 |
| EP | 0 818 648 | | 5/2001 |
| FR | 2 814 778 | | 4/2002 |
| GB | 1642857 | | 8/1952 |
| GB | 32 34 633 | | 3/1984 |
| GB | 2 127 094 | | 4/1984 |
| GB | 2 364 352 | | 1/2002 |
| JP | 2001073755 | A * | 3/2001 |
| WO | WO 00/45044 | | 8/2000 |

* cited by examiner

FLUID GUIDELINE, ESPECIALLY IN THE FORM OF A TUBE FOR TAKING UP UNTREATED AIR IN AN AIR FILTER OF A MOTOR VEHICLE

BACKGROUND OF THE INVENTION

The invention concerns a fluid guideline with at least two structural elements made of substantially soundproof material and at least one opening for noise damping, whereby an impedance change (in particular in the form of an impedance discontinuity) of the flow resistance of the fluid flowing through the fluid guideline is present between two adjacent structural elements.

In tubes for untreated air that are installed in engine compartments of motor vehicles in order to take up or, respectively, to guide surrounding air from the radiator to an air filter, one makes an effort on the production side to reduce the prevalent sound level during the motor operation. In the automobile industry, for this purpose one follows primarily two methods. Either resonators are attached to the tubes for untreated air, or tubes for untreated air are equipped with what is known as a bypass tube, whereby specific frequencies can be filtered out. Technically refined resonators should filter out as broad a spectrum of noise as possible and can be detuned, while bypass paths can optionally be connected or, respectively, separated by valve controls. However, resonators require some space (in places they comprise a volume of some liters) and bypass tubes also increase the amount of material due to a length of up to 30 cm. In the continuous search for simple and effective noise-reducing tubes for untreated air, the use of porous materials in the processing of untreated air is also under discussion.

Thus, from JP 60050265, a sintered, porous pipe socket made of aluminum powder is known that is connected via a tube piece with an air filter. The porous, permeable pipe socket thereby characterizes itself by a substantially reduced sound level with consistent air supply efficiency. However, the pipe socket has the disadvantage of higher material costs.

EP 0 837 238 A2 discloses the use of a porous, malleable, sound-absorbing material with which the air filter or its supply line can be lined internally. An additionally lined inner wall likewise leads to an increased expenditure of additional costs.

The use of a porous band material to produce a tube is known from EP 818 648 B1. A band is thereby coiled in the shape of a tube as well as glued in the form of a tube and used for sound damping in the air tube in the engine compartment. In practice, a woven synthetic is used as a porous material, whereby in addition to the actual shaping treatment process, the production of the woven band is additionally expensive.

Openings for noise damping used with impedance changes are known in the prior art. Thus, for example, a line section is known from WO 00/45044 that is assembled from two shells connected with one another, whereby gaps are arranged in the interstices between the shells for damping. In addition, the line section exhibits a diffuser effect and the tube wall can be provided with bores. Overall, the known line section is very complex in assembly.

According to DE 196 29 368 A1, a constriction reducing the diameter of a tube is provided at a perforation of the tubes to suppress the generation of harmonic tones by sound damping for pulsing gases, in particular for exhaust gas from internal combustion engines, with separation from the perforation. This leads to a relatively complicated assembly.

A fluid guideline according to species is known from GB 2 364 352. In the known fluid guideline, straight, stiff elements are perforated with openings and respectively arranged between flexible elements, whereby the flexible elements can be fashioned as a type of corrugated tube section. The introduction of openings in the straight elements must thereby ensue in adaptation with the geometry of aforesaid elements (which is relatively time-consuming and expensive) in order to generate a desired sound damping.

SUMMARY OF THE INVENTION

It is therefore the object of the present invention to further develop the fluid guideline according to species, such that the disadvantages of the prior art are overcome, in particular to provide a tube for untreated air that is cost-effective in the utmost to produce, and for this exhibits sound-reducing properties to a high degree.

This object is inventively achieved in that the at least one opening is arranged in the region of the impedance change between two adjacent structural elements.

It can thereby be provided that a plurality of openings are arranged along the circumference of the fluid guideline, and/or each opening is fashioned substantially as a rectangle.

It is also inventively proposed that the total area of the opening or, respectively, openings corresponds substantially to the cross sectional area of the fluid guideline, in particular in the region of its air up-take or its air venting.

Furthermore, it is proposed that each opening is stamped or punched and may be covered with an open-pored, porous protective fabric.

It is inventively, preferably proposed that the structural elements are produced from a synthetic, in particular polypropylene, preferably in one piece by an injection or blow molding process.

It can also be provided that the protective fabric is a synthetic non-woven material, in particular made of polypropylene, whereby the protective fabric is preferably glued or bonded with the structural elements.

It can also be provided that the structural elements comprise a corrugated sheathing element between two substantially form-stable regions, whereby preferably at least one opening is respectively arranged between the one substantially form-stable region and the corrugated sheathing element on the one hand and the corrugated sheathing element and the other substantially form-stable region on the other hand.

It can be provided that the one substantially form-stable region is connected or molded with a radiator connection socket, and/or the other substantially form-stable region is connected or molded with an air filter connection socket, for assembly in the engine compartment of a motor vehicle.

Finally, an inventive device is characterized by at least one curve, preferably in the one substantially form-stable region, and/or at least one recess, preferably in the other substantially form-stable region.

The invention thus is based on the perception that openings in the wall of a tube for untreated air mounted, for example, in the engine compartment of a motor vehicle between the radiator and an air filter (in particular before and after structural elements integrated into the tube for untreated air), at which an impedance change of the flow resistance ensues, substantially contribute to lowering the sound level ensuing during the motor operation, foremost the noise at uptake of untreated air (thus at the radiator). A tube for untreated air is substantially a $\lambda/4$ resonator in which sound damping via reflection and/or interference ensues via the inventive application of the openings. The diameter of the openings presents substantially a compromise solution between a maximization of the flow resistance on the one hand and a minimization of the acoustic resistance on the other hand. It has been inventively established that the aforementioned compromise solution exists when the surface area of the openings is substantially on the order of the cross-sectional surface area of the tube for untreated air, in particular in the range of its outlet.

The stamping of openings that then should be covered with an open-pored, porous material (such as for example in the form of a polypropylene non-woven material) is proven to be particularly practicable.

The structural elements of the sheathing hose for untreated air, in particular in the form of a corrugated tube or sheathing element between two substantially form-stable regions, are made for production reasons from a synthetic such as polypropylene, as one piece by a blow-molded operation and the openings can simply be stamped. Furthermore, it is advantageous for the production to bond the protective material of the openings to the structural elements. Overall, a tube for untreated air that is cost-effective and exceedingly effective in damping thus occurs.

Further features and advantages of the invention emerge from the specification below, in which an exemplary embodiment of the invention is explained in detail using a schematic drawing.

DESCRIPTION OF THE PREFERRED EMBODIMENT

Figure 1:
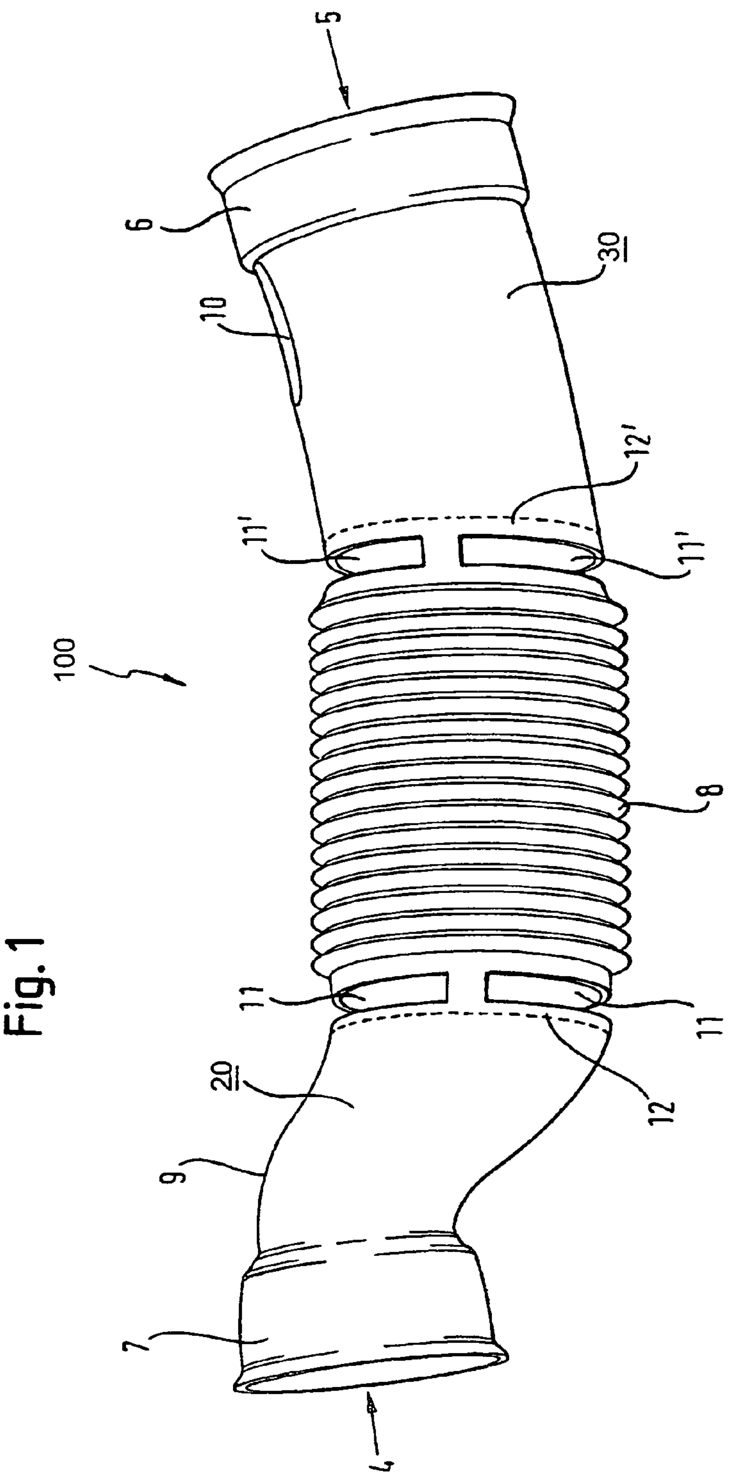
FIG. 1 is an exemplary embodiment of an inventive tube for untreated air in a perspective side view.

FIG. 1 shows an inventive tube 100 for untreated air as it can be applied between a radiator and an air filter (respectively not shown). The tube 100 for untreated air (for example, fashioned from a synthetic material) comprises a flexible corrugated tube or sheathing hose 8 between regions 20, 30 (that are substantially soundproof as well as form-stable) at whose respective ends 4, 5 are a radiator connection nozzle 6 or, respectively, an air filter connection nozzle 7. The form-stable region 20 facing the air filter connection socket 7 is additionally shaped by a curve 9, while the opposite form-stable region 30 facing the radiator connection socket 6 comprises a recess 10 to facilitate the final assembly in the engine compartment (not shown) of the motor vehicle. Substantially rectangular openings 11, 11' that are fashioned circumferentially are located on both ends of the corrugated tube 8. The surface area of the openings 11, 11' corresponds approximately to the opening area (not shown) of the air filter connection socket 7 and are arranged within via adhesive zones 12, 12', which have adhesive applied to the surface for mounting an air permeable non-woven material. Each adhesive zone 12, 12', thus, serves to prevent penetration of dirt particles into the tube 100 for untreated air, in that an air-permeable non-woven material is applied over the openings 11, 11' and is held by the adhesive applied by means of adhesive wheels (both not shown) in the region of the adhesive zone 12, 12'. This non-woven material, which likewise can be fashioned from a synthetic, can alternatively be bonded with the walls of the tube for untreated air.

Figure 2:
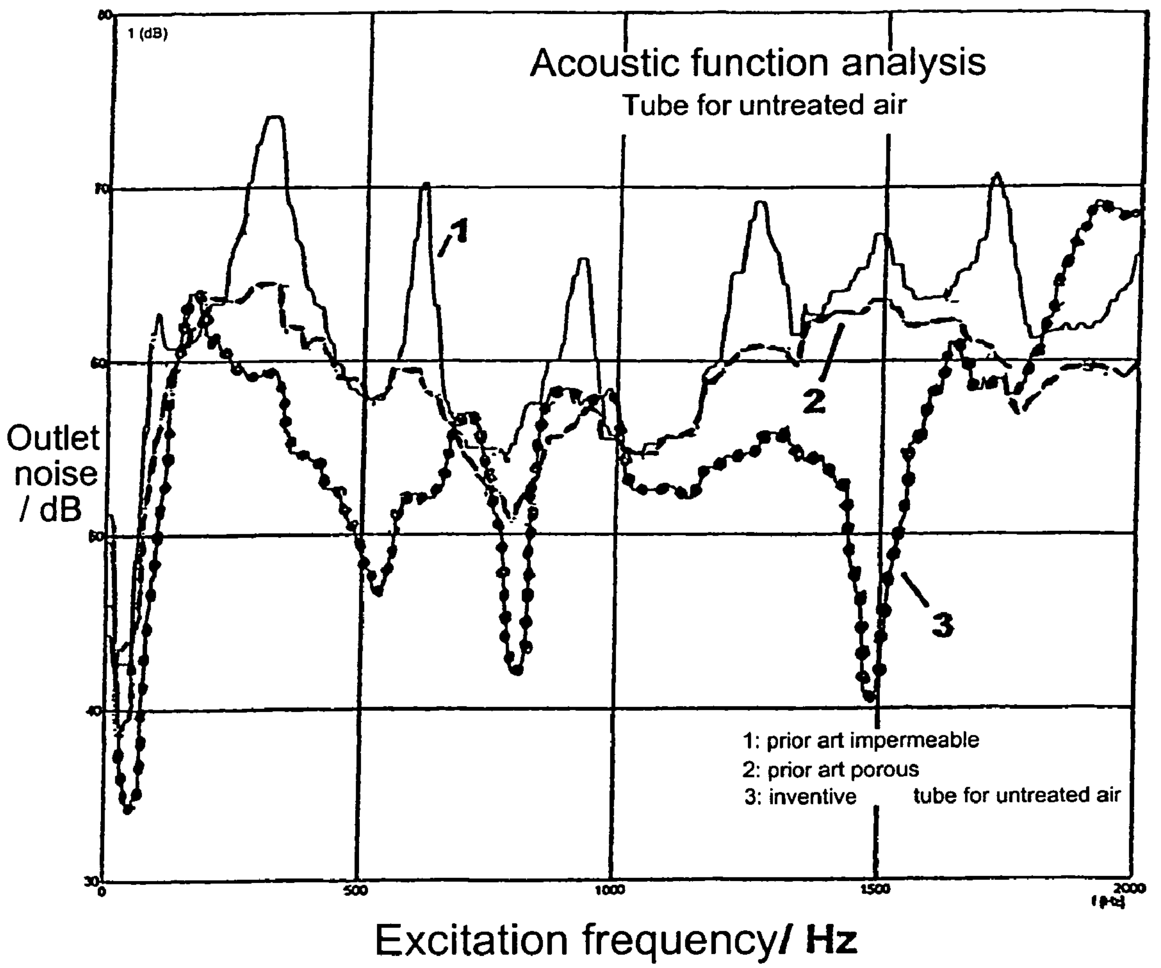
FIG. 2 is a graph of a frequency-dependent damping.

In the graphic of FIG. 2, the damping of the opening noise, for example the noise at the end of the tube for untreated air (thus the end 4 of the radiator connection socket 6) is comparatively plotted against excitation frequencies for three different types of tubes for untreated air. The curve 1 represents the acoustic behavior of a tube for untreated air that comprises a corrugated tube or sheathing element but with no porous walls, and in addition that is fashioned from synthetic, as is mostly typical in the prior art. The curve 2 represents the acoustic behavior of a flexible sheathing hose for untreated air that was produced corresponding to the method disclosed in EP 0 818 648 B1. Finally, the curve 3 represents the acoustic behavior of an inventive tube 100 for untreated air. Via a comparison of the three curves with one another, the more effective sound damping of the inventive tube 100 for untreated air with regard to the tubes for untreated air known from the prior art is clearly to be learned from FIG. 2.

The features of the invention disclosed in the preceding specification, in the claims as well as in the drawing can be substantial both individually and in any arbitrary combination for the realization of the invention in its various embodiments.

The invention claimed is:

1. A fluid guideline, comprising:

at least first and second adjacent structural elements connected one after the other in a direction of flowing fluid which flows from an inlet at one end of the first structural element to an outlet at one end of the second structural element, each of said first and second structural elements being made of substantially soundproof material, and which have an impedance change of flow resistance to the flowing fluid through the fluid guideline in a region between the adjacent first and second structural elements;

at least one opening for sound dampening via at least one of reflection and interference in said fluid guideline being arranged in said region of said impedance change between the at least first and second adjacent structural elements, said at least one opening being open to the environment; and said first and second adjacent structural elements having no openings at a perimeter thereof outside of said impedance change region.

2. A fluid guideline according to claim 1 wherein a plurality of said openings are arranged along a perimeter of said impedance change region and each said opening has a rectangular configuration.

3. A fluid guideline according to claim 2 wherein a total area of the openings corresponds substantially to a cross-sectional area of the fluid guideline at said outlet thereof.

4. A fluid guideline according to claim 1 wherein the at least one opening is stamped into said region of the impedance change.

5. A fluid guideline according to claim 1 wherein the at least one opening is covered with an open-pored, porous protective fabric.

6. A fluid guideline according to claim 5 wherein the protective fabric comprises a synthetic non-woven material.

7. A fluid guideline according to claim 6 wherein the synthetic material comprises polypropylene.

8. A fluid guideline according to claim 6 wherein the protective fabric is attached to at least one of the structural elements.

9. A fluid guideline according to claim 1 wherein the structural elements are produced from a synthetic material.

10. A fluid guideline according to claim 9 wherein the synthetic material comprises polypropylene.

11. A fluid guideline according to claim 9 wherein the structural elements are injection-molded elements.

12. A fluid guideline according to claim 9 wherein each of the structural elements is a one-piece blow-molded member.

13. A fluid guideline according to claim 11 wherein a third structural element is provided, the second structural element comprising a corrugated sheathing and arranged between the first and third structural elements, said first and third structural elements comprising form-stable regions, and wherein said region of impedance change comprises a first region of impedance change provided between the first and second structural elements and a second region of impedance change is provided between the second and third structural elements, and each of the first and second regions of impedance change having at least one opening open to the environment.

14. A fluid guideline according to claim 13 wherein at least one of the form-stable regions has a curved portion.

15. A fluid guideline according to claim 13 wherein at least one of the form-stable regions has a recess.

16. A fluid guideline according to claim 13 wherein at least one of the form-stable regions is provided with a radiator connection socket and the other form-stable region is provided with an air filter connection socket, and said fluid guideline is for use in an engine compartment of a motor vehicle.

17. A fluid guideline according to claim 16 wherein one of the form-stable regions is provided with a curved portion and the other of the form-stable regions is provided with a recess.

18. A fluid guideline, comprising:

a first form-stable region having a fluid inlet;

a flexible corrugated tube connected to the first form-stable region at an end opposite said inlet and wherein a flow-resistance impedance change of the fluid flowing through the fluid guideline occurs in a first region between said first form-stable region and said corrugated tube, at least one opening being provided in said first region for sound dampening via at least one of reflection and interference in said fluid guideline, said at least one opening being open to the environment;

a second form-stable region connected to an end of the flexible corrugated tube opposite the end where said first form-stable region connects, a flow-resistance impedance change of the fluid flowing through the fluid guideline occurring in a second region between the corrugated tube and the second form-stable region, said second region having at least one opening for sound dampening via at least one of reflection and interference in said fluid guideline, said at least one opening being open to the environment;

said corrugated tube and said first and second form-stable regions each comprising substantially soundproof material and having no openings at a periphery thereof outside of said first and second impedance change regions; and a fluid outlet at an end of said second form-stable region opposite said end where said corrugated tube connects to said second form-stable region.

* * * * *